(12) United States Patent
Shi et al.

(10) Patent No.: US 12,039,136 B2
(45) Date of Patent: Jul. 16, 2024

(54) TOUCH SUBSTRATE HAVING LAYERS WITH VARYING REFRACTIVE INDEX, TOUCH DISPLAYING DEVICE, AND MANUFACTURING METHOD OF TOUCH SUBSTRATE

(71) Applicants: WUHAN BOE OPTOELECTRONICS TECHNOLOGY CO., LTD., Beijing (CN); BOE TECHNOLOGY GROUP CO., LTD., Beijing (CN)

(72) Inventors: Xia Shi, Beijing (CN); Yuanhui Guo, Beijing (CN); Jie Han, Beijing (CN); Jian Zhao, Beijing (CN); Peipei Zhang, Beijing (CN); Yujie Gao, Beijing (CN)

(73) Assignees: WUHAN BOE OPTOELECTRONICS TECHNOLOGY CO., LTD., Hubei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/312,038

(22) Filed: May 4, 2023

(65) Prior Publication Data
US 2023/0273698 A1  Aug. 31, 2023

Related U.S. Application Data (63) Continuation-in-part of application No. 17/350,192, filed on Jun. 17, 2021, now Pat. No. 11,681,407.

(30) Foreign Application Priority Data

Nov. 18, 2020  (CN) .......................... 202011300620.9
Apr. 18, 2023  (CN) .......................... 202320876438.0

(51) Int. Cl.
*G06F 3/042* (2006.01)

(52) U.S. Cl.
CPC .. *G06F 3/0421* (2013.01); *G06F 2203/04103* (2013.01)

(58) Field of Classification Search
CPC .................. G06F 3/046; G06F 3/0412; G06F 2203/04103
See application file for complete search history.

(56) References Cited

U.S. PATENT DOCUMENTS

| | | |
|---|---|---|
| 2013/0169597 A1 | 7/2013 | Yin et al. |
| 2016/0024695 A1 | 1/2016 | Conti et al. |

(Continued)

FOREIGN PATENT DOCUMENTS

| | | |
|---|---|---|
| CN | 106201071 A | 12/2016 |
| CN | 107491226 A | 12/2017 |

(Continued)

OTHER PUBLICATIONS

Non Final Office Action dated May 4, 2022, issued in U.S. Appl. No. 17/350,192 (13 pages).

(Continued)

*Primary Examiner* — Lisa S Landis
(74) *Attorney, Agent, or Firm* — WHDA, LLP (57) ABSTRACT

A touch substrate includes a base plate; touch electrodes; and at least three light adjustment layers stacked on a side of the base plate, and adjacent two of the light adjustment layers have different refractive indexes; the touch electrodes include a first touch electrode and a second touch electrode that are disposed on a side, backing onto the light adjustment layers, of the base plate, the second touch electrode is disposed on a side, backing onto the base plate, of the first touch electrode; the touch substrate further includes: a first insulating layer disposed between the base plate and the first (Continued)

touch electrode; a second insulating layer disposed between the first touch electrode and the second touch electrode; and a third insulating layer disposed on a side, backing onto the base plate, of the second touch electrode.

20 Claims, 5 Drawing Sheets

(56) References Cited

U.S. PATENT DOCUMENTS

| | | | |
|---|---|---|---|
| 2016/0274695 | A1 | 9/2016 | Ando et al. |
| 2017/0357348 | A1* | 12/2017 | Lee .......................... G02B 1/14 |
| 2018/0159081 | A1 | 6/2018 | Choi et al. |
| 2018/0246605 | A1 | 8/2018 | Zhou |
| 2020/0150799 | A1 | 5/2020 | Lee et al. |

FOREIGN PATENT DOCUMENTS

| | | |
|---|---|---|
| CN | 213182707 U | 5/2021 |
| TW | 201329583 A | 7/2013 |
| WO | 2018000830 A1 | 1/2018 |

OTHER PUBLICATIONS

Final Office Action dated Nov. 15, 2022, issued in U.S. Appl. No. 17/350,192 (14 pages).

Office Action dated May 18, 2024, issued in counterpart CN application No. 202011300620.9, with English translation. (27 pages).

* cited by examiner

TOUCH SUBSTRATE HAVING LAYERS WITH VARYING REFRACTIVE INDEX, TOUCH DISPLAYING DEVICE, AND MANUFACTURING METHOD OF TOUCH SUBSTRATE

CROSS REFERENCE TO RELATED APPLICATIONS

The present application is a continuation-in-part application of U.S. application Ser. No. 17/350,192, filed on Jun. 17, 2021, and claims priority to Chinese Patent Disclosure No. 202011300620.9 filed with the China National Intellectual Property Administration on Nov. 18, 2020 and Chinese Patent Disclosure No. 202320876438.0 filed with the China National Intellectual Property Administration on Apr. 18, 2023, which are incorporated herein by reference in its entirety.

TECHNICAL FIELD

The disclosure relates to the technical field of display, in particular to a manufacturing method of a touch substrate, a touch substrate, and a touch displaying device.

BACKGROUND

With the development of the touch technology, touch panels, as the core component of human-computer interaction systems, have been widely applied to various digital information display systems to meet people's requirements for information exchange and user experience.

SUMMARY

The embodiments of the disclosure provide a manufacturing method of a touch substrate, a touch substrate, and a touch displaying device.

The embodiments of the disclosure provide a touch substrate, including:
 a base plate;
 touch electrodes; and
 at least three light adjustment layers stacked on a side of the base plate, and adjacent two of the light adjustment layers have different refractive indexes;
 the touch electrodes comprise a first touch electrode and a second touch electrode that are disposed on a side, backing onto the light adjustment layers, of the base plate, the second touch electrode is disposed on a side, backing onto the base plate, of the first touch electrode;
 the touch substrate further includes:
 a first insulating layer disposed between the base plate and the first touch electrode;
 a second insulating layer disposed between the first touch electrode and the second touch electrode; and
 a third insulating layer disposed on a side, backing onto the base plate, of the second touch electrode.

In some embodiments, the light adjustment layers includes a first light adjustment layer, a second light adjustment layer, a third light adjustment layer, a fourth light adjustment layer and a fifth light adjustment layer stacked in sequence, wherein the fifth light adjustment layer is disposed close to the base plate, the first light adjustment layer is disposed far away from the base plate; the refractive indexes of the first light adjustment layer, the third light adjustment layer and the fifth light adjustment layer are less than the refractive indexes of the second light adjustment layer and the fourth light adjustment layer.

In some embodiments, the first light adjustment layer, the third light adjustment layer and the fifth light adjustment layer are made from at least one of silicon dioxide and magnesium fluoride, and the second light adjustment layer and the fourth light adjustment layer are made from at least one of titanium dioxide and niobium oxide.

In some embodiments, when a host material of the first light adjustment layer, the third light adjustment layer and the fifth light adjustment layer is silicon dioxide and the host material of the second light adjustment layer and the fourth light adjustment layer is niobium oxide, a thickness of the fifth light adjustment layer is greater than thicknesses of the first light adjustment layer, the second light adjustment layer, the third light adjustment layer and the fourth light adjustment layer, the thicknesses of the second light adjustment layer and the fourth light adjustment layer are greater than thicknesses of the first light adjustment layer and the third light adjustment layer.

In some embodiments, the thicknesses of the first light adjustment layer, the second light adjustment layer, the third light adjustment layer, the fourth light adjustment layer and the fifth light adjustment layer are all greater than or equal to 50 nm, and less than or equal to 150 nm.

In some embodiments, the first insulating layer and the second insulating layer have different refractive indexes, and the third insulating layer and the second insulating layer have different refractive indexes.

In some embodiments, the refractive index of the second insulating layer is less than the refractive indexes of the first insulating layer and the third insulating layer.

In some embodiments, the first insulating layer and the third insulating layer are made from at least one of titanium dioxide and niobium oxide; the second insulating layer is made from at least one of silicon dioxide and magnesium fluoride.

In some embodiments, the light adjustment layers include a sixth light adjustment layer, a seventh light adjustment layer, and an eighth light adjustment layer stacked in sequence, wherein the sixth light adjustment layer is disposed close to the base plate, the eighth light adjustment layer is disposed far away from the base plate, and the refractive index of the seventh light adjustment layer is less than refractive indexes of the sixth light adjustment layer and the eighth light adjustment layer.

In some embodiments, the sixth light adjustment layer and the eighth light adjustment layer are made from at least one of titanium dioxide and niobium oxide, the seventh light adjustment layer is made from at least one of silicon dioxide and magnesium fluoride.

In some embodiments, when host materials of the sixth light adjustment layer and the eighth light adjustment layer are niobium oxide, the host material of the seventh light adjustment layer is silicon dioxide, thicknesses of the sixth light adjustment layer and the eighth light adjustment layer are both greater than or equal to 100 nm, and less than or equal to 130 nm; the thickness of the seventh light adjustment layer is greater than or equal to 80 nm, and less than or equal to 110 nm.

In some embodiments, the first touch electrode and the second touch electrode intersect to form metal grids.

In some embodiments, the metal grids include:
 a first metal grid formed by intersection of the first touch electrode, wherein the first metal grid comprises a first node located at a crossing point of the first touch electrode, and a first hollow area surrounded by the first touch electrode; and a second metal grid formed by intersection of the second touch electrode, wherein the second metal grid comprises a second node located at a crossing point of the second touch electrode, and a second hollow area surrounded by the second touch electrode;

wherein an orthographic projection of the first node on the base plate is located at a center of the orthographic projection of the second hollow area on the base plate, and the orthographic projection of the second node on the base plate is located at a center of the orthographic projection of the first hollow area on the base plate.

In some embodiments, the first touch electrode and the second touch electrode have an uneven surface on a side facing away from the base plate.

The embodiments of the disclosure further provide a touch displaying device including a display panel and the touch substrate described above, and the touch substrate is located on a light emitting side of the display panel.

In some embodiments, the display panel is located on the side, backing onto the light adjustment layers, of the base plate.

In some embodiments, the touch substrate and the display panel are bonded with an optically clear adhesive.

The embodiments of the disclosure further provide a manufacturing method of a touch substrate, comprising:

providing a base plate;

forming at least three light adjustment layers on a side of the base plate sequentially, wherein refractive indexes of adjacent light adjustment layers are different; and forming a first insulating layer, a first touch electrode, a second insulating layer, a second touch electrode and a third insulating layer on a side, backing onto the light adjustment layers, of the base plate sequentially In some embodiments, the forming at least three light adjustment layers on a side of the base plate sequentially includes:

forming a fifth light adjustment layer on a side of the base plate;

forming a fourth light adjustment layer on a side, backing onto the base plate, of the fifth light adjustment layer;

forming a third light adjustment layer on a side, backing onto the base plate, of the fourth light adjustment layer;

forming a second light adjustment layer on a side, backing onto the base plate, of the third light adjustment layer; and forming a first light adjustment layer on a side, backing onto the base plate, of the second light adjustment layer, wherein the refractive indexes of the first light adjustment layer, the third light adjustment layer and the fifth light adjustment layer are less than the refractive indexes of the second light adjustment layer and the fourth light adjustment layer.

In some embodiments, a DC magnetron sputtering process is used to form the second light adjustment layer and the fourth light adjustment layer with a high refractive index, and a radio frequency magnetron sputtering process is used to form the first light adjustment layer, the third light adjustment layer and the fifth light adjustment layer with a low refractive index.

The above description is only an overview of the technical solution of this disclosure, which can be implemented according to the contents of the specification in order to understand the technical means of this disclosure more clearly, and in order to make the above and other objects, features and advantages of this disclosure more obvious and understandable, the detailed description of this disclosure will be given below.

BRIEF DESCRIPTION OF THE DRAWINGS

To more clearly explain the technical solutions of the embodiments of the disclosure, drawings required for describing the embodiments of the disclosure will be briefly introduced below. Obviously, the drawings in the following description merely illustrate some embodiments of the disclosure, and those ordinarily skilled in the art may obtain other drawings according to the following ones without creative labor.

DETAILED DESCRIPTION

To make the above purposes, features and advantages of the disclosure clearer and easily understood, the disclosure will be described in further detail below in conjunction with the accompanying drawings and specific implementations. Obviously, the embodiments in the following description are merely illustrative ones, and are not all possible ones of the disclosure. All other embodiments obtained by those ordinarily skilled in the art based on the following ones without creative labor should also fall within the protection scope of the disclosure.

Figure 1:
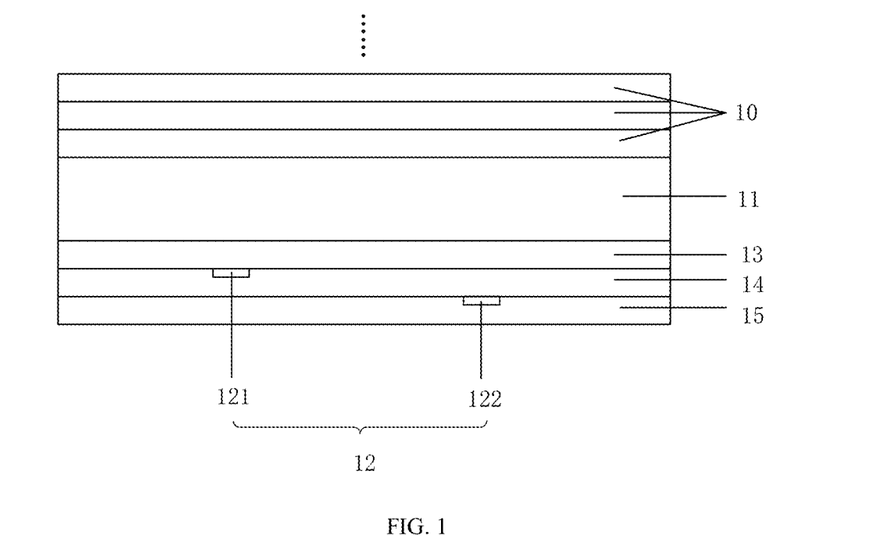
FIG. 1 is a sectional structural view of a touch substrate provided by embodiments of the disclosure.

The present disclosure provides a touch substrate. As shown in FIG. 1, the touch substrate comprises a base plate 11 and touch electrodes 12. Further, at least three light adjustment layers 10 are stacked on a side of the base plate 11, and adjacent light adjustment layers 10 have different refractive indexes. The touch electrodes 12 comprise a first touch electrode 121 and a second touch electrode 122 disposed on a side of, backing onto the light adjustment layers 10, of the base plate 11, the second touch electrode 122 is disposed on a side, backing onto the base plate 11, of the first touch electrode 121.

As shown in FIG. 1, the touch substrate further comprises: a first insulating layer 13 disposed between the base plate 11 and the first touch electrode 121, a second insulating layer 14 disposed between the first touch electrode 121 and the second touch electrode 122, and a third insulating layer 15 disposed on a side, backing onto the base plate 11, of the second touch electrode 122.

The base plate 11 may be made from materials such as glass, and is used as a base plate and a protective layer of the light adjustment layers 10 and the touch electrodes 12.

The touch substrate provided by the present disclosure can realize mirror refection, the principle is as follows: based on the theory of film interference, light will be refracted and reflected when entering another medium from one medium, light interference will be generated when an optical path difference between multiple reflected light beams meets certain conditions, the interference will be enhanced when the optical path difference between the reflected light beams is an integral multiple of $2\pi$, and reflected light will be increased.

In a specific implementation, the touch substrate may comprise more than three light adjustment layers 10, so that the mirror reflective index of the touch substrate may be increased. By adjusting the materials, thicknesses and number of the light adjustment layers 10, the reflective index of the touch substrate provided by this embodiment may reach 30-70%.

In the touch substrate provided by this embodiment, at least three light adjustment layers 10 are provided, and adjacent light adjustment layers 10 have different refractive indexes, so that the touch substrate has a mirror reflection function. By bonding the touch substrate provided by this embodiment to a display panel, a touch function, a mirror reflection function and a display function may be realized, the problem of a single function and a poor interaction capacity of existing display products are solved, and people's requirements for information exchange and user experience are met. In addition, the touch substrate provided by this embodiment has a simple manufacturing process and a low cost, thus having great competitiveness in markets and smart home.

In addition, in the touch substrate provided by the present disclosure, the touch electrode 12 and the reflection functional layer formed by the light adjustment layers 10 are disposed on two sides of the base plate 11 respectively, so that interferences of the touch electrodes 12 on the mirror reflection function are avoided, and the mirror reflection effect of the touch substrate is improved.

Figure 2:
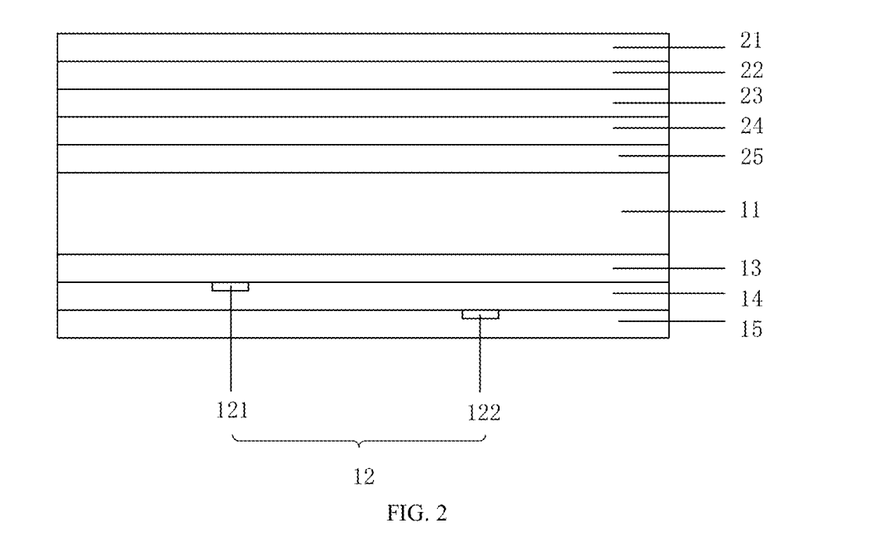
FIG. 2 is a sectional structural view of a first touch substrate provided by an embodiment of the disclosure.

In some embodiments, as shown in FIG. 2, the light adjustment layers 10 include a first light adjustment layer 21, a second light adjustment layer 22, a third light adjustment layer 23, a fourth light adjustment layer 24 and a fifth light adjustment layer 25 stacked in sequence. The fifth light adjustment layer 25 is disposed close to the base plate 11, the first light adjustment layer 21 is disposed far away from the base plate 11, and the refractive indexes of the first light adjustment layer 21, the third light adjustment layer 23 and the fifth light adjustment layer 25 are less than that of the second light adjustment layer 22 and the fourth light adjustment layer 24.

In the present embodiment, a five-layer film system formed by the first light adjustment layer 21, the second light adjustment layer 22, the third light adjustment layer 23, the fourth light adjustment layer 24 and the fifth light adjustment layer 25, the refractive index of which is low-high-low-high-low in turn, is used as a mirror functional layer.

In some embodiments, the first light adjustment layer 21, the third light adjustment layer 23 and the fifth light adjustment layer 25 are made from at least one of silicon dioxide and magnesium fluoride. The second light adjustment layer 22 and the fourth light adjustment layer 24 are made from at least one of titanium dioxide and niobium oxide.

Among them, the first light adjustment layer 21, the third light adjustment layer 23 and the fifth light adjustment layer 25 are made from a low-refractive index material, and any two of the first light adjustment layer 21, the third light adjustment layer 23 and the fifth light adjustment layer 25 may have different or same material. The second light adjustment layer 22 and the fourth light adjustment layer 24 are made from a high-refractive index material, and may have different or same material.

In some embodiments, in the case that the host material of the first light adjustment layer 21, the third light adjustment layer 23 and the fifth light adjustment layer 25 is silicon dioxide, and the host material of the second light adjustment layer 22 and the fourth light adjustment layer 24 is niobium oxide, the thickness of the fifth light adjustment layer 25 is greater than that of the first light adjustment layer 21, the second light adjustment layer 22, the third light adjustment layer 23 and the fourth light adjustment layer 24, the thickness of the second light adjustment layer 22 and the fourth light adjustment layer 24 is greater than that of the first light adjustment layer 21 and the third light adjustment layer 23. In this way, a better mirror reflection effect can be obtained.

In some embodiments, the thicknesses of the first light adjustment layer 21, the second light adjustment layer 22, the third light adjustment layer 23, the fourth light adjustment layer 24 and the fifth light adjustment layer 25 are all greater than or equal to 50 nm, and less than or equal to 150 nm.

Figure 4:
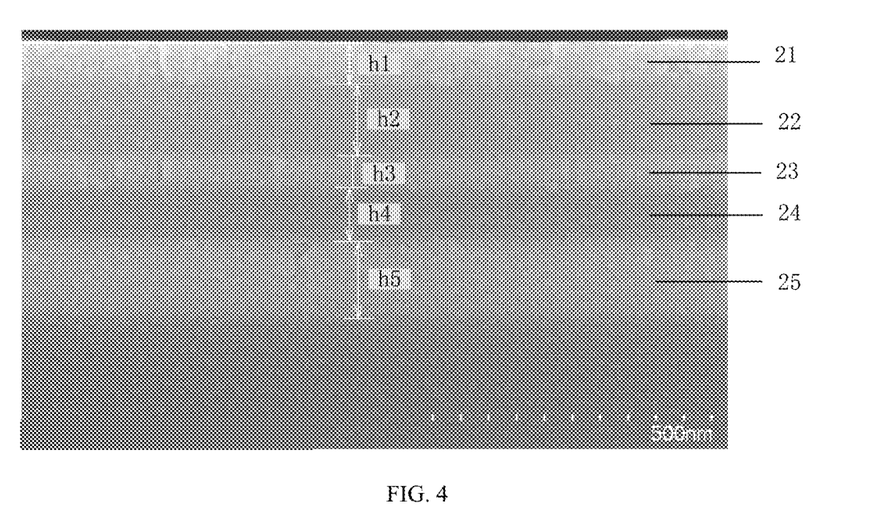
FIG. 4 is a sectional electron micrograph of the first touch substrate provided by the embodiment of the disclosure.

For example, as shown in FIG. 4, the thickness of the first light adjustment layer 21 is h1, the thickness of the second light adjustment layer 22 is h2, the thickness of the third light adjustment layer 23 is h3, the thickness of the fourth light adjustment layer 24 is h4, the thickness of the fifth light adjustment layer 25 is h5, and h1, h2, h3, h4, h5 are 75.3 nm, 128.8 nm, 57.5 nm, 97.1 nm and 138.7 nm respectively. In FIG. 4, the host material of the first light adjustment layer 21, the third light adjustment layer 23 and the fifth light adjustment layer 25 is silicon dioxide, and the host material of the second light adjustment layer 22 and the fourth light adjustment layer 24 is niobium oxide.

In some embodiments, as shown in FIG. 1, the first insulating layer 13 and the second insulating layer 14 have different refractive indexes, and the second insulating layer 14 and the third insulating layer 15 have different refractive indexes.

In the present embodiment, among the first insulating layer 13, the second insulating layer 14 and the third insulating layer 15, adjacent insulating layers have different refractive indexes, so that a mirror refection function may also be implemented by adjusting the materials and the thicknesses of the insulating layers. In this implementation, reflection functional layers, namely a reflection functional layer formed by the light adjustment layers 10 and a reflection functional layer formed by the three insulating layers, are disposed on two sides of the base plate 11 respectively, so that the mirror reflective index of the touch substrate is increased, the reflective index difference under different wavelengths is decreased, and reflective color casts are avoided.

In some embodiments, the refractive index of the second insulating layer 14 is less than that of the first insulating layer 13 and the third insulation layer 15.

In the present embodiment, the second insulating layer 14 with low refractive index is disposed between the first insulating layer 13 and the third insulating layer 15 with high refractive index, and a three-layer film system formed by the first insulating layer 13, the second insulating layer 14, the third insulating layer 15, the refractive index of which is high-low-high in turn, is used as a mirror functional layer.

In some embodiments, the first insulating layer 13 and the third insulating layer 15 are made from at least one of titanium dioxide and niobium oxide; the second insulating layer 14 is made from at least one of silicon dioxide and magnesium fluoride.

Among them, the first insulating layer 13 and the third insulating layer 15 are made from a high-refractive index material, and the second insulating layer 14 is made from a low-refractive index material. The first insulating layer 13 and the third insulating layer 15 may have different or same material.

Figure 3:
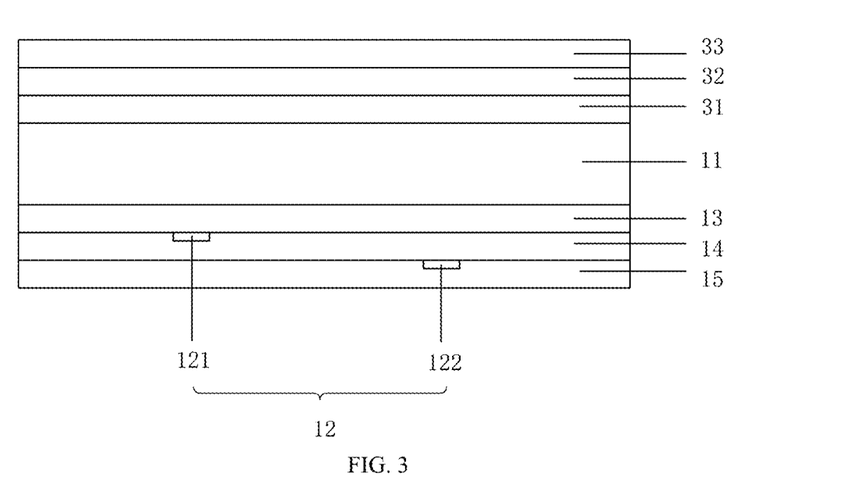
FIG. 3 is a sectional structural view of a second touch substrate provided by an embodiment of the disclosure.

In some embodiments, as shown in FIG. 3, the light adjustment layers 10 include a sixth light adjustment layer 31, a seventh light adjustment layer 32, an eighth light adjustment layer 33 stacked in sequence. The sixth light adjustment layer 31 is disposed close to the base plate 11, the eighth light adjustment layer 33 is disposed far away from the base plate 11, and the refractive index of the seventh light adjustment layer 32 is less than that of the sixth light adjustment layer 31 and the eighth light adjustment layer 33.

As shown in FIG. 3, the seventh light adjustment layer 32 with a low refractive index is disposed between the sixth light adjustment layer 31 and the eighth light adjustment layer 33 with a high refractive index, and a three-layer film system formed by the sixth light adjustment layer 31, the seventh light adjustment layer 32 and the eighth light adjustment layer 33, the refractive index of which is high-low-high in turn, is used as a mirror functional layer.

In some embodiments, the sixth light adjustment layer 31 and the eighth light adjustment layer 33 are made from at least one of titanium dioxide and niobium oxide; the seventh light adjustment layer 32 is made from at least one of silicon dioxide and magnesium fluoride.

Among them, the sixth light adjustment layer 31 and the eighth light adjustment layer 33 are made from a high-refractive index material, and the seventh light adjustment layer 32 is made from a low-refractive index material. The sixth light adjustment layer 31 and the eighth light adjustment layer 33 may have different or same material.

In some embodiments, when the host materials of the sixth light adjustment layer 31 and the eighth light adjustment layer 33 are niobium oxide, the host material of the seventh light adjustment layer 32 is silicon dioxide, the thicknesses of the sixth light adjustment layer 31 and the eighth light adjustment layer 33 are both greater than or equal to 100 nm, and less than or equal to 130 nm; the thickness of the seventh light adjustment layer 32 is greater than or equal to 80 nm, and less than or equal to 110 nm. In this way, a good mirror reflection effect may be realized.

For example, the thicknesses of the sixth light adjustment layer 31 and the eighth light adjustment layer 33 are both 113 nm, the thickness of the seventh light adjustment layer 32 is 97 nm, so that the mirror reflective index can be further increased.

Figure 5:
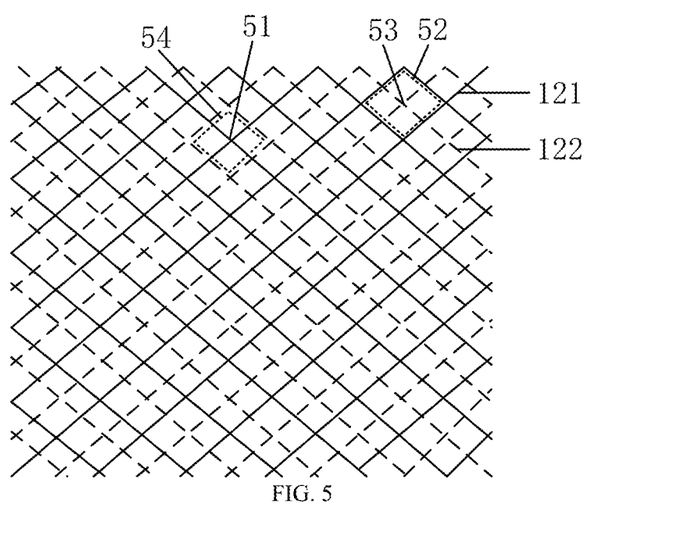
FIG. 5 is a planer structural view illustrating metal grids formed by a first touch electrode and a second touch electrode.

In some embodiments, as shown in FIG. 5, the first touch electrode 121 and the second touch electrode 122 intersect to form metal grids. The first touch electrode 121 is a drive electrode, and the second touch electrode 122 is an induction electrode; or, the first touch electrode 121 is an induction electrode, and the second touch electrode 122 is a drive electrode.

In this implementation, the second insulating layer 14 is equivalent to an insulating layer between the first touch electrode 121 and the second touch electrode 122, and the first insulating layer 13 and the third insulating layer 15 are equivalent to protective layers of the first touch electrode 121 and the second touch electrode 122.

In some embodiments, as shown in FIG. 5, the metal grids include: a first metal grid (the grid formed by solid lines in FIG. 5), which is formed by intersection of the first touch electrodes 121, including a first node 51 located at a crossing point of the first touch electrodes 121, and a first hollow area 52 surrounded by the first touch electrodes 121; a second metal grid (the grid formed by dotted line in FIG. 5), which is formed by intersection of the second touch electrodes 122, including a second node 53 located at a crossing point of the second touch electrodes 122, and a second hollow area 54 surrounded by the second touch electrodes 122. An orthographic projection of the first node 51 on the base plate 11 is located at a center of the orthographic projection of the second hollow area 54 on the base plate 11, and the orthographic projection of the second node 53 on the base plate 11 is located at a center of the orthographic projection of the first hollow area 52 on the base plate 11.

Figure 6:
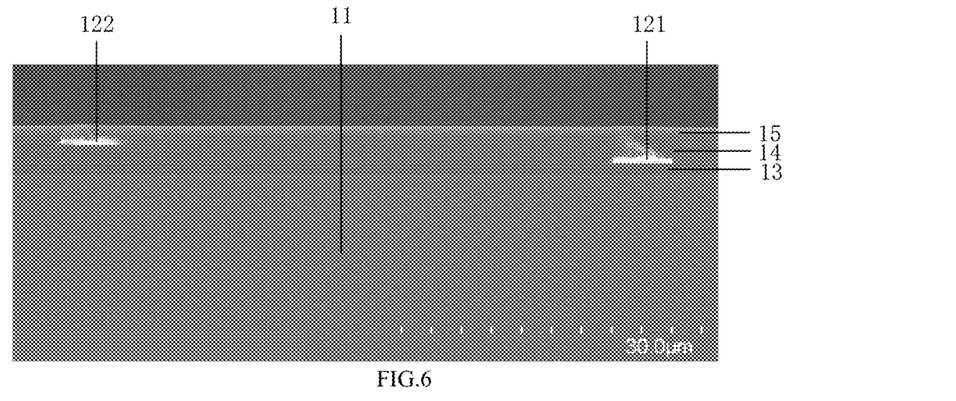
FIG. 6 is a sectional electron micrograph of the first touch electrode and the second touch electrode provided by an embodiment of the disclosure.

In some implementations, as shown in FIG. 6, the first touch electrode 121 and the second touch electrode 122 have an uneven surface on a side facing away from the base plate 11.

In order to avoid short circuit, the line widths of the first touch electrodes 121 and the second touch electrodes 122 forming the metal grids are small, resulting in uneven surfaces of the first touch electrodes 121 and the second touch electrodes 122.

Figure 7:
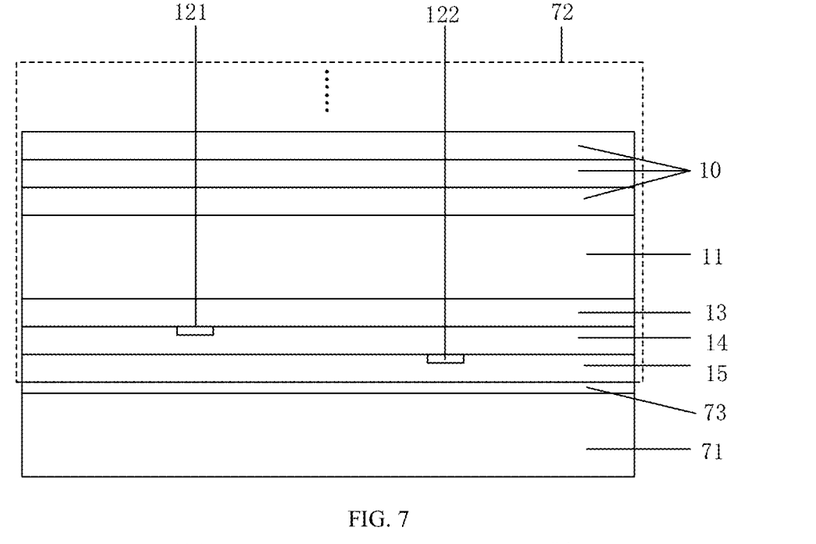
FIG. 7 is a sectional structural view of a touch displaying device provided by embodiments of the disclosure.

Another embodiment of the disclosure further provides a touch displaying device. Referring to FIG. 7, the touch displaying device includes a display panel 71, and the touch substrate 72 provided by any one embodiment mentioned above, wherein the touch substrate 72 is located on a light emitting side of the display panel 71, and the touch substrate 72 and the display panel 71 are bonded with an optically clear adhesive 73.

It should be noted that the touch displaying device in this embodiment may be any products or components with a 2D or 3D display function, such as a display panel, electronic paper, a mobile phone, a tablet personnel computer, a television, a notebook computer, a digital photo frame or a navigator.

The optically clear adhesive 73 is a special adhesive for bonding transparent optical elements, is colorless and transparent, has a light transmissivity over 90% and high bonding strength. The optically clear adhesive 73 may be an organic silicone adhesive, an acrylic acid resin adhesive, an unsaturated polyester adhesive, a polyurethane adhesive, an epoxy resin adhesive, or a treating agent, to improve the optical performance or decease the cure shrinkage rate.

In a specific implementation, the display panel 71 may be located on a side, backing onto the base plate 11, of the light adjustment layers 10, or on a side, backing onto the light adjustment layers 10, of the base plate 11. As shown in FIG. 7, when the touch substrate 72 and the display panel 71 are bonded with the optically clear adhesive 73, the display panel 71 is disposed on a side, backing onto the light adjustment layer 13, of the base plate 11, so that the mirror reflection effect of the light adjustment layers 10 will not be interfered by the optically clear adhesive 73.

Figure 8:
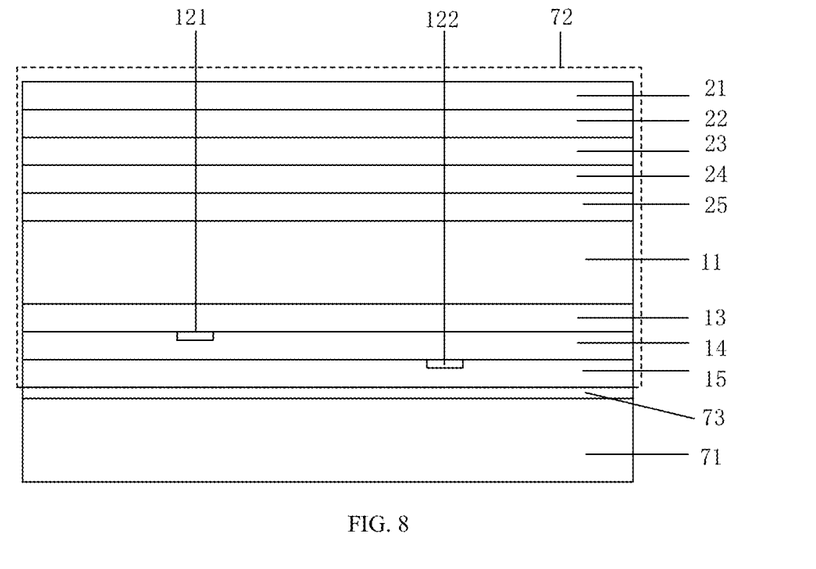
FIG. 8 is a sectional structural view of a first touch displaying device provided by an embodiment of the disclosure.
Figure 9:
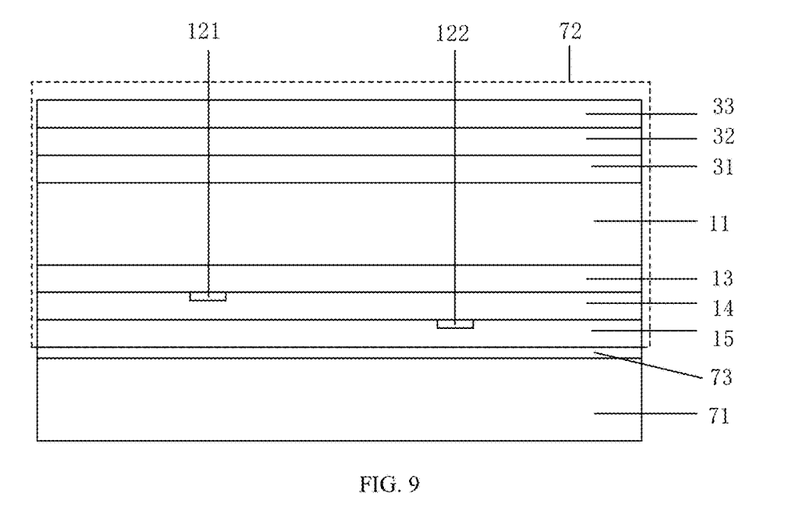
FIG. 9 is a sectional structural view of a second touch displaying device provided by an embodiment of the disclosure.

Specifically, as shown in FIG. 8 or FIG. 9, the first touch electrode 121 of the touch substrate 72 is disposed between the first insulating layer 13 and the second insulating layer 14 and the second touch electrode 122 is disposed between the second insulating layer 14 and the third insulating layer 15, the display panel 71 is bonded on a side, backing onto the third insulating layer 15, of the base plate 11 through the optically clear adhesive 73.

In the embodiments, the touch substrate and the display panel are bonded with the optically clear adhesive (OCA), so that the touch displaying device has both a mirror function, a touch function and a display function, solves the problem of a single function and a poor interaction capacity of existing display products, and meets people's requirements for information exchange and user experience.

Figure 10:
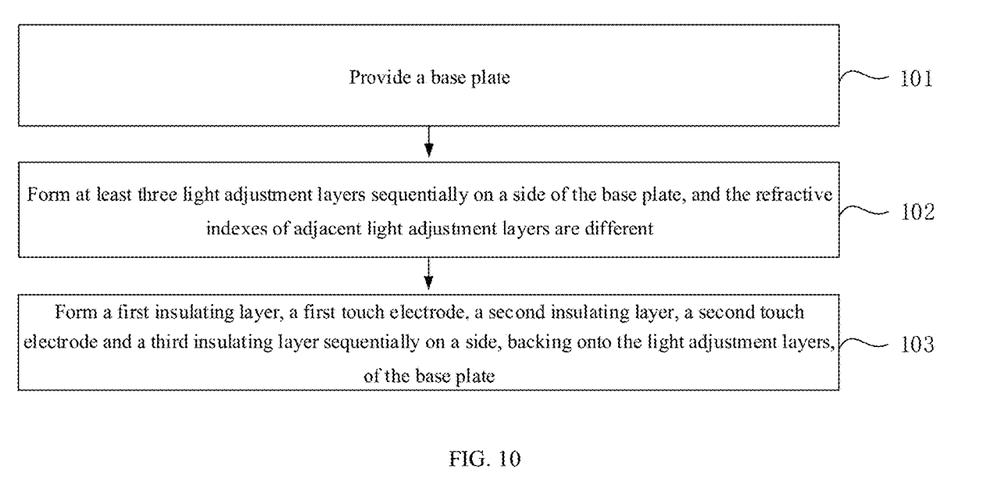
FIG. 10 is a flow diagram of the steps of a manufacturing method of a touch substrate according to embodiments of the disclosure.

Another embodiment of the disclosure further provides a manufacturing method of a touch substrate. The touch substrate comprises a base plate and touch electrodes. As shown in FIG. 10, the manufacturing method comprises:

At step 101, a base plate is provided.

At step 102, at least three light adjustment layers are sequentially formed on one side of the base plate, and the refractive indexes of adjacent light adjustment layers are different.

At step 103, a first insulating layer, a first touch electrode, a second insulating layer, a second touch electrode and a third insulating layer are sequentially formed on a side, backing onto the light adjustment layers, of the base plate.

The touch substrate described in any of the above-mentioned embodiments can be prepared by using the manufacturing method provided in the present disclosure, and the structure and effect of the touch substrate can refer to the description of the above-mentioned embodiments.

The step 103 may include: forming the first insulating layer on a side, backing onto the light adjustment layers, of the base plate; forming the first touch electrode on a side, backing onto the base plate, of the first insulating layer; forming the second insulating layer on a side, backing onto the base plate, of the first touch electrode; forming the second touch electrode on a side, backing onto the base plate, of the second insulating layer; forming the third insulating layer on a side, backing onto the base plate, of the second touch electrode.

In a specific implementation, the light adjustment layers may be formed by a DC magnetron sputtering process or a radio frequency magnetron sputtering process. Different light adjustment layers may be prepared by using the same or different processes.

For example, when the light adjustment layers are made from high refractive index materials such as titanium dioxide, the light adjustment layers may be formed by the DC magnetron sputtering process; and when the light adjustment layers are made from low refractive index materials such as silicon dioxide, the light adjustment layers may be formed by the radio frequency magnetron sputtering process.

In some embodiments, the step 102 includes: forming a fifth light adjustment layer on a side of the base plate; forming a fourth light adjustment layer on a side, backing onto the base plate, of the fifth light adjustment layer; forming a third light adjustment layer on a side, backing onto the base plate, of the fourth light adjustment layer; forming a second light adjustment layer on a side, backing onto the base plate, of the third light adjustment layer; forming a first light adjustment layer on a side, backing onto the base plate, of the second light adjustment layer, thereby the touch substrate as shown in FIG. 2.

In this embodiment, the DC magnetron sputtering process can be used to prepare the second light adjustment layer and the fourth light adjustment layer with a high refractive index, and the radio frequency magnetron sputtering process can be used to prepare the first light adjustment layer, the third light adjustment layer and the fifth light adjustment layer with a low refractive index.

In some embodiments, the step 102 may specifically include: forming a sixth light adjustment layer on a side of the base plate; forming a seventh light adjustment layer on a side, backing onto the base plate, of the sixth light adjustment layer; forming an eighth light adjustment layer on a side, backing onto the base plate, of the seventh light adjustment layer, thereby obtaining the touch substrate as shown in FIG. 3.

In this embodiment, the DC magnetron sputtering process can be used to prepare the sixth light adjustment layer and the eighth light adjustment layer with a high refractive index, and the radio frequency magnetron sputtering process can be used to prepare the seventh light adjustment layer with a low refractive index.

It should be noted that the preparation process of the light adjustment layers is not limited to the above process. For example, the light adjustment layers may also be prepared by a vapor deposition process, or the like. The specific preparation process of the film layers may be determined according to actual conditions such as the materials of the film layers, and this embodiment has no limitation to this.

The embodiments in this specification are described progressively, the differences from other embodiments are emphatically stated in each embodiment, and the similarities of these embodiments may be cross-referenced.

Finally, it should be noted that relational terms such as "first" and "second" in this specification are merely used to distinguish one entity or operation from the other one, and do not definitely indicate or imply that these entities or operations have any actual relations or sequences. In addition, the term "comprise" or "include" or other variations are intended to refer to non-exclusive inclusion, so that a process, method, article or device comprising a series of elements not only comprises these elements listed, but also comprises other elements that are not clearly listed, or inherent elements of the process, method, article or device. Unless otherwise clearly specified, an element defined by the expression "comprise a" shall not exclusive of other identical elements in a process, method, article or device comprising said element.

The manufacturing method of a touch substrate, the touch substrate, and the touch displaying device provided by the disclosure are introduced in detail above, specific examples are used in this specification to expound the principle and implementation of the disclosure, and the description of the above embodiments is merely used to assist those skilled in the art in understanding the method and core concept thereof of the disclosure. In addition, those ordinarily skilled in the art can make changes to the specific implementation and disclosure scope based on the concept of the disclosure. So, the contents of the specification should not be construed as limitations of the disclosure.

The invention claimed is:

1. A touch substrate, comprising:
    a base plate;
    touch electrodes; and
    at least three light adjustment layers stacked on a side of the base plate, wherein adjacent two of the light adjustment layers have different refractive indexes;
    wherein the touch electrodes comprise a first touch electrode and a second touch electrode that are disposed on a side, backing onto the light adjustment layers, of the base plate, the second touch electrode is disposed on a side, backing onto the base plate, of the first touch electrode;
wherein the touch substrate further comprises:
a first insulating layer disposed between the base plate and the first touch electrode;
a second insulating layer disposed between the first touch electrode and the second touch electrode; and
a third insulating layer disposed on a side, backing onto the base plate, of the second touch electrode.

2. The touch substrate according to claim 1, wherein the light adjustment layers comprises a first light adjustment layer, a second light adjustment layer, a third light adjustment layer, a fourth light adjustment layer and a fifth light adjustment layer stacked in sequence, wherein the fifth light adjustment layer is disposed close to the base plate, the first light adjustment layer is disposed far away from the base plate;
wherein the refractive indexes of the first light adjustment layer, the third light adjustment layer and the fifth light adjustment layer are less than the refractive indexes of the second light adjustment layer and the fourth light adjustment layer.

3. The touch substrate according to claim 2, wherein the first light adjustment layer, the third light adjustment layer and the fifth light adjustment layer are made from at least one of silicon dioxide and magnesium fluoride, and the second light adjustment layer and the fourth light adjustment layer are made from at least one of titanium dioxide and niobium oxide.

4. The touch substrate according to claim 3, wherein when a host material of the first light adjustment layer, the third light adjustment layer and the fifth light adjustment layer is silicon dioxide and the host material of the second light adjustment layer and the fourth light adjustment layer is niobium oxide, a thickness of the fifth light adjustment layer is greater than thicknesses of the first light adjustment layer, the second light adjustment layer, the third light adjustment layer and the fourth light adjustment layer, the thicknesses of the second light adjustment layer and the fourth light adjustment layer are greater than thicknesses of the first light adjustment layer and the third light adjustment layer.

5. The touch substrate according to claim 4, wherein the thicknesses of the first light adjustment layer, the second light adjustment layer, the third light adjustment layer, the fourth light adjustment layer and the fifth light adjustment layer are all greater than or equal to 50 nm, and less than or equal to 150 nm.

6. The touch substrate according to claim 1, wherein the first insulating layer and the second insulating layer have different refractive indexes, and the third insulating layer and the second insulating layer have different refractive indexes.

7. The touch substrate according to claim 6, wherein the refractive index of the second insulating layer is less than the refractive indexes of the first insulating layer and the third insulating layer.

8. The touch substrate according to claim 7, wherein the first insulating layer and the third insulating layer are made from at least one of titanium dioxide and niobium oxide; the second insulating layer is made from at least one of silicon dioxide and magnesium fluoride.

9. The touch substrate according to claim 1, wherein the light adjustment layers comprise a sixth light adjustment layer, a seventh light adjustment layer, and an eighth light adjustment layer stacked in sequence, wherein the sixth light adjustment layer is disposed close to the base plate, the eighth light adjustment layer is disposed far away from the base plate, and the refractive index of the seventh light adjustment layer is less than refractive indexes of the sixth light adjustment layer and the eighth light adjustment layer.

10. The touch substrate according to claim 9, wherein the sixth light adjustment layer and the eighth light adjustment layer are made from at least one of titanium dioxide and niobium oxide, the seventh light adjustment layer is made from at least one of silicon dioxide and magnesium fluoride.

11. The touch substrate according to claim 9, wherein when host materials of the sixth light adjustment layer and the eighth light adjustment layer are niobium oxide, the host material of the seventh light adjustment layer is silicon dioxide, thicknesses of the sixth light adjustment layer and the eighth light adjustment layer are both greater than or equal to 100 nm, and less than or equal to 130 nm; the thickness of the seventh light adjustment layer is greater than or equal to 80 nm, and less than or equal to 110 nm.

12. The touch substrate according to claim 1, wherein the first touch electrode and the second touch electrode intersect with each other, and form metal grids.

13. The touch substrate according to claim 12, wherein the metal grids comprise:
a first metal grid formed by intersection of the first touch electrode, wherein the first metal grid comprises a first node located at a crossing point of the first touch electrode, and a first hollow area surrounded by the first touch electrode; and
a second metal grid formed by intersection of the second touch electrode, wherein the second metal grid comprises a second node located at a crossing point of the second touch electrode, and a second hollow area surrounded by the second touch electrode;
wherein an orthographic projection of the first node on the base plate is located at a center of the orthographic projection of the second hollow area on the base plate, and the orthographic projection of the second node on the base plate is located at a center of the orthographic projection of the first hollow area on the base plate.

14. The touch substrate according to claim 12, wherein the first touch electrode and the second touch electrode have an uneven surface on a side facing away from the base plate.

15. A touch displaying device, comprising a display panel and the touch substrate according to claim 1, wherein the touch substrate is located on a light emitting side of the display panel.

16. The touch displaying device according to claim 15, wherein the display panel is located on the side, backing onto the light adjustment layers, of the base plate.

17. The touch displaying device according to claim 15, wherein the touch substrate and the display panel are bonded with an optically clear adhesive.

18. A manufacturing method of a touch substrate, comprising:
providing a base plate;
forming at least three light adjustment layers on a side of the base plate sequentially, wherein refractive indexes of adjacent light adjustment layers are different; and
forming a first insulating layer, a first touch electrode, a second insulating layer, a second touch electrode and a third insulating layer on a side, backing onto the light adjustment layers, of the base plate sequentially.

19. The manufacturing method according to claim 18, wherein the forming at least three light adjustment layers on a side of the base plate sequentially comprises:
forming a fifth light adjustment layer on a side of the base plate;

forming a fourth light adjustment layer on a side, backing onto the base plate, of the fifth light adjustment layer;

forming a third light adjustment layer on a side, backing onto the base plate, of the fourth light adjustment layer;

forming a second light adjustment layer on a side, backing onto the base plate, of the third light adjustment layer; and forming a first light adjustment layer on a side, backing onto the base plate, of the second light adjustment layer;

wherein the refractive indexes of the first light adjustment layer, the third light adjustment layer and the fifth light adjustment layer are less than the refractive indexes of the second light adjustment layer and the fourth light adjustment layer.

20. The manufacturing method according to claim 19, wherein a DC magnetron sputtering process is used to form the second light adjustment layer and the fourth light adjustment layer, and a radio frequency magnetron sputtering process is used to form the first light adjustment layer, the third light adjustment layer and the fifth light adjustment layer.

* * * * *